US012504903B2

(12) United States Patent
Banerjee et al.

(10) Patent No.: US 12,504,903 B2
(45) Date of Patent: Dec. 23, 2025

(54) SYNCHRONIZING OPERATIONS BETWEEN DECKS OF A MEMORY SYSTEM

(71) Applicant: Micron Technology, Inc., Boise, ID (US)

(72) Inventors: Amiya Banerjee, Bangalore (IN); Thibash Rajamani Balakrishnan, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/434,375

(22) Filed: Feb. 6, 2024

(65) Prior Publication Data

US 2024/0281162 A1   Aug. 22, 2024

Related U.S. Application Data

(60) Provisional application No. 63/447,531, filed on Feb. 22, 2023.

(51) Int. Cl.
*G06F 3/06* (2006.01)

(52) U.S. Cl.
CPC ............ *G06F 3/064* (2013.01); *G06F 3/0652* (2013.01); *G06F 3/0604* (2013.01); *G06F 3/0673* (2013.01)

(58) Field of Classification Search
CPC ...... G06F 3/0604; G06F 3/064; G06F 3/0652; G06F 3/0673; G06F 3/0679
See application file for complete search history.

(56) References Cited

U.S. PATENT DOCUMENTS

| | | | |
|---|---|---|---|
| 2022/0100650 A1* | 3/2022 | Lai | G06F 12/0891 |
| 2022/0291835 A1* | 9/2022 | Malshe | G06F 3/0679 |
| 2024/0112741 A1* | 4/2024 | Guo | G11C 16/10 |

* cited by examiner

*Primary Examiner* — Jane W Benner
(74) *Attorney, Agent, or Firm* — Holland & Hart LLP (57) ABSTRACT

Methods, systems, and devices for synchronizing operations between decks of a memory system are described. In some examples, a memory system may determine a PEC difference between sister decks of physical blocks of the memory system. A memory system controller may associate the sister decks with respective virtual blocks. The controller may scan each virtual block of the memory system to determine which blocks are to be recycled, and may generate a list of virtual blocks having a VPC that satisfies a first threshold. In some cases, the controller may perform one or more threshold comparisons to determine whether to perform the maintenance operation on the first sister deck or both the first sister deck and the second sister deck.

20 Claims, 5 Drawing Sheets

SYNCHRONIZING OPERATIONS BETWEEN DECKS OF A MEMORY SYSTEM

CROSS REFERENCE

The present application for patent claims priority to and the benefit of U.S. Provisional Application No. 63/447,531 by Banerjee et al., entitled "SYNCHRONIZING OPERATIONS BETWEEN DECKS OF A MEMORY SYSTEM," filed Feb. 22, 2023, assigned to the assignee hereof, and is expressly incorporated by reference in its entirety herein.

TECHNICAL FIELD

The following relates to one or more systems for memory, including synchronizing operations between decks of a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

A memory system may include a memory array having one or more blocks (e.g., one or more physical blocks of memory cells). In some cases, a block of the memory array may include multiple pages of memory cells. Additionally, each block of the memory array may include one or more decks. For example, the block may include a first deck (e.g., an upper portion of the block) and a second deck (e.g., a lower portion of the block). Such decks of a block may be referred to as sister decks and may share some structures (e.g., common layers such as a drain-end select gate (SGD) layer, a source-end select gate (SGS) layer, or the like) between the two decks.

In some cases, performing an operation on a first sister deck may affect a second sister deck. For example, if a controller performs an operation to erase the first sister deck, the controller may apply a relatively large bias to one or more word lines associated with the second sister deck. In some cases, if one sister deck undergoes a significantly greater quantity of program-erase cycles (PECs) than a second sister deck, an overall health of the memory system may be degraded. Accordingly, the controller may maintain a PEC count of each sister deck and may identify a PEC difference between the sister decks. In some examples, the controller may erase both sister decks together to maintain a similar PEC count. However, such techniques may increase write amplification on the memory array (e.g., due to erasing data which is subsequently re-written), thus decreasing its overall performance and reliability.

In examples described herein, a memory system controller may associate sister decks with respective virtual blocks (VBs). For example, the controller may associate a first deck of a physical block with a first VB (e.g., VB0) and may associate a second deck of the physical block with a second VB (e.g., VB1). The first VB and the second VB may be associated with indices that form an odd-even pair, which may allow the controller to identify associations between VBs and sister decks. In some cases, the controller may establish similar associations for other physical blocks of a memory array (e.g., a second block may include VB2 and VB3, and so on).

In some instances, the controller may determine to perform a maintenance operation on the memory array (e.g., a garbage collection operation), and may scan each VB of the memory array to determine which blocks are to be recycled. For example, the controller may generate a list of VBs which includes VBs having a valid-page-count (VPC) that falls below a first threshold (e.g., gc_vpc_threshold). In some cases, the controller may perform the maintenance operation on a physical block upon identifying that the VBs associated with each sister deck of the physical block are included in the list of VBs (e.g., that each VB has a VPC that falls below the first threshold).

In some other examples, such as when a first VB associated with a first sister deck of a physical block is included in the list of VBs and a second VB associated with a second sister deck of the physical block is not included in the list of VBs, the controller may perform one or more operations (e.g., comparisons) to determine whether to perform the maintenance operation on the first sister deck, the second sister deck, or both. For example, the controller may compare a PEC difference of the sister decks to a second threshold (e.g., sister_deck_pec_diff_percent), a third threshold (e.g., sister_deck_pec_diff_percent_extreme), or may compare a VPC of one or more of the sister decks to fourth threshold (e.g., gc_vpc_threshold_relax). By performing maintenance operations on VBs as described herein, the overall performance and reliability of an associated memory system may be improved.

Figure 1:
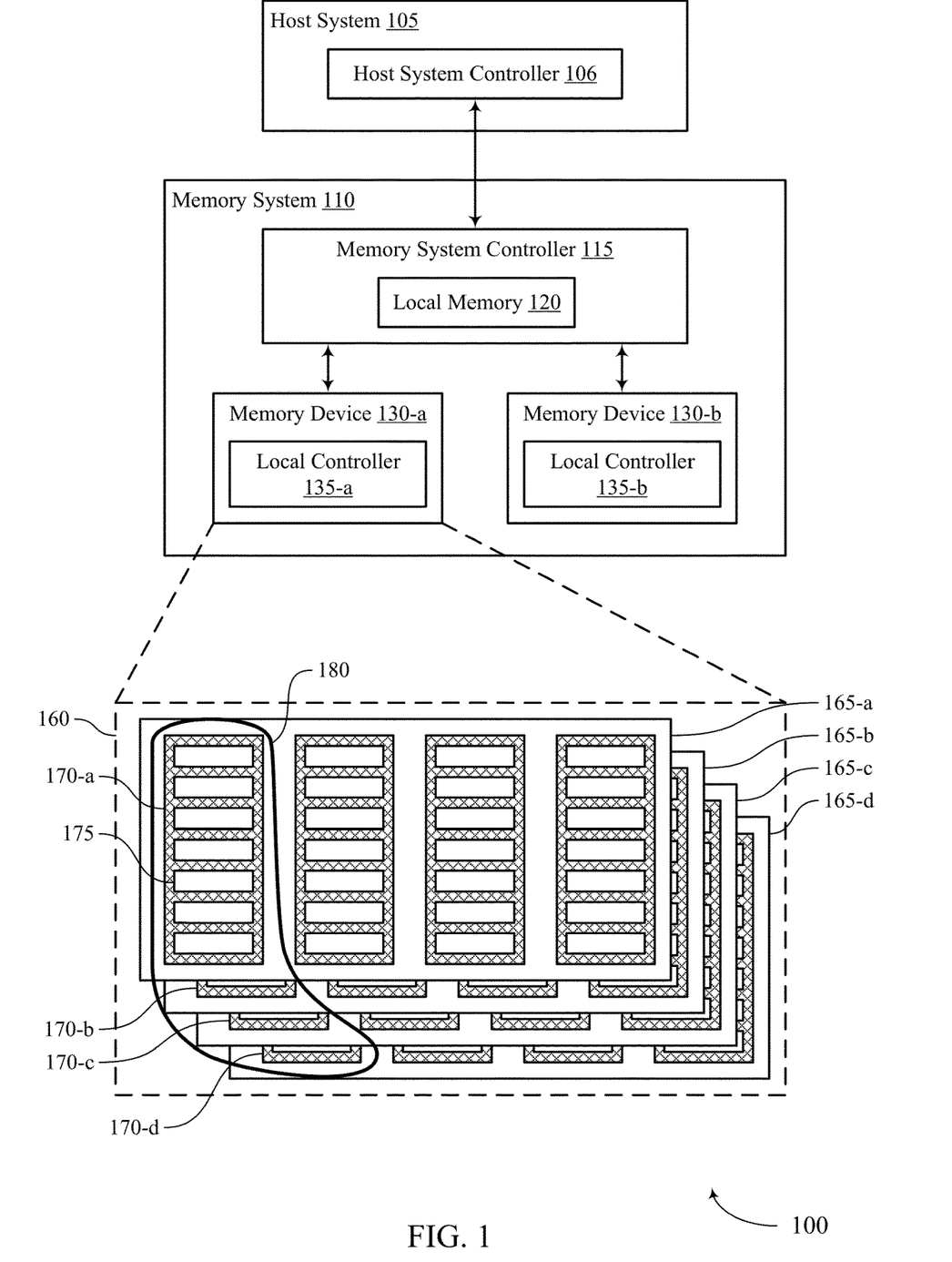
FIG. 1 illustrates an example of a system that supports synchronizing operations between decks of a memory system in accordance with examples as disclosed herein.
Figure 2:
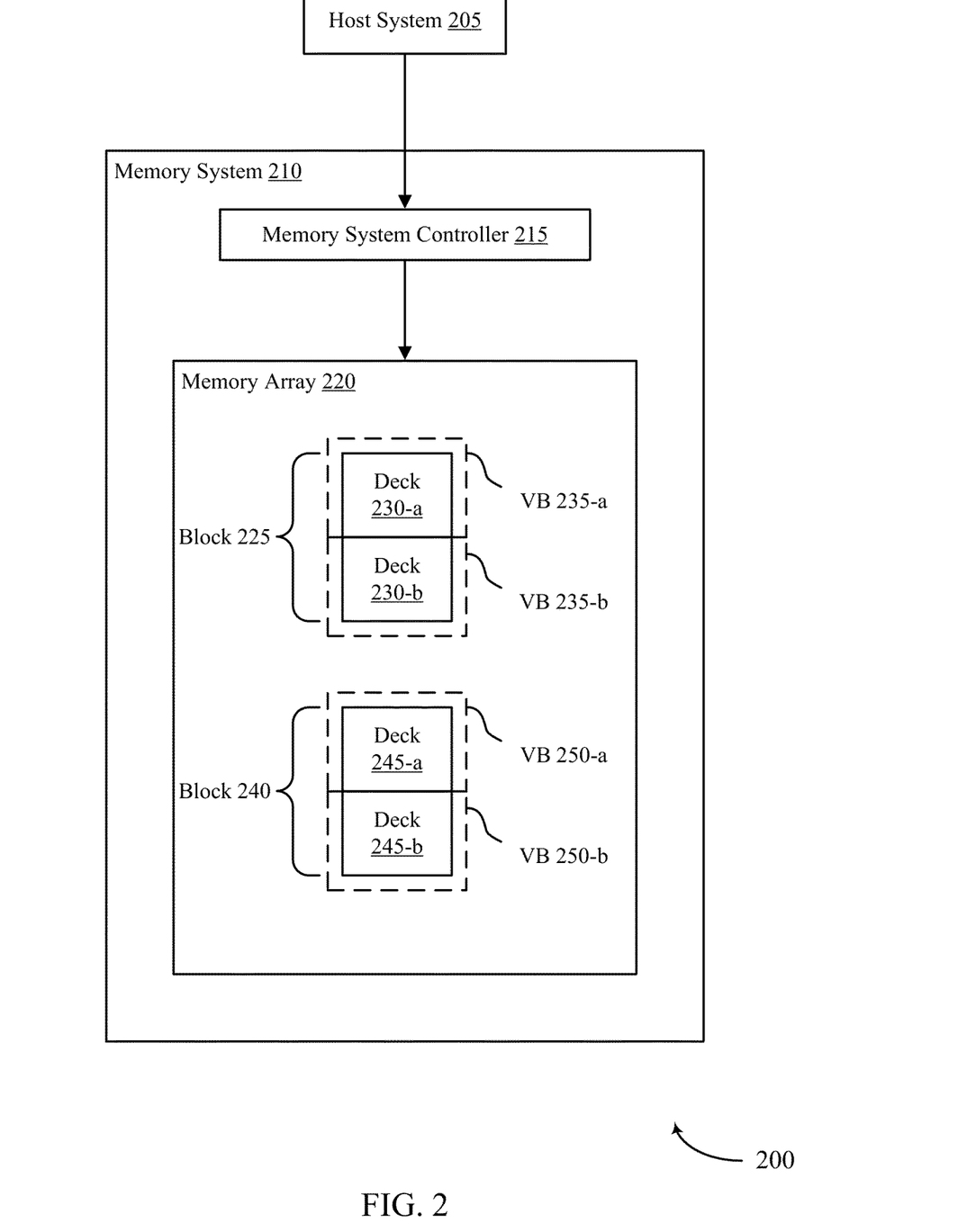
FIG. 2 illustrates an example of a system that supports synchronizing operations between decks of a memory system in accordance with examples as disclosed herein.

Features of the disclosure are initially described in the context of systems, devices, and circuits with reference to FIGS. 1 through 2. Features of the disclosure are described in the context of a process flow with reference to FIG. 3. These and other features of the disclosure are further illustrated by and described in the context of an apparatus diagram and flowcharts that relate to synchronizing operations between decks of a memory system with reference to FIGS. 4 and 5.

FIG. 1 illustrates an example of a system 100 that supports synchronizing operations between decks of a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support synchronizing operations between decks of a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In examples described herein, a memory system controller 115 may associate sister decks of a block 170 with respective virtual blocks (VBs). For example, the memory system controller 115 may associate a first deck of a physical block 170 with a first VB (e.g., VB0) and may associate a second deck of the physical block 170 with a second VB (e.g., VB1). The first VB and the second VB may be associated with indices that form an odd-even pair, which may allow the memory system controller 115 to identify associations between VBs and sister decks. In some cases, the memory system controller 115 may establish similar associations for other physical blocks 170 of a memory device 130 (e.g., a second block may include VB2 and VB3, and so on).

In some instances, the memory system controller 115 may determine to perform a maintenance operation on the memory device 130 (e.g., a garbage collection operation), and may scan each VB of the memory device 130 to determine which blocks 170 are to be recycled. For example, the memory system controller 115 may generate a list of VBs which includes VBs having a valid-page-count (VPC) that falls below a first threshold (e.g., gc_vpc_threshold). In some cases, the memory system controller 115 may perform the maintenance operation on a physical block 170 upon identifying that the VBs associated with each sister deck of the physical block 170 are included in the list of VBs (e.g., that each VB has a VPC that falls below the first threshold).

In some other examples, such as when a first VB associated with a first sister deck of a physical block 170 is included in the list of VBs and a second VB associated with a second sister deck of the physical block 170 is not included in the list of VBs, the memory system controller 115 may perform one or more operations (e.g., comparisons) to determine whether to perform the maintenance operation on the first sister deck, the second sister deck, or both. For example, the memory system controller 115 may compare a PEC difference of the sister decks to a second threshold (e.g., sister_deck_pec_diff_percent), a third threshold (e.g., sister_deck_pec_diff_percent_extreme), or may compare a VPC of one or more of the sister decks to fourth threshold (e.g., gc_vpc_threshold_relax). By performing maintenance operations on VBs as described herein, the overall performance and reliability of the memory system 110 may be improved.

FIG. 2 illustrates an example of a system 200 that supports synchronizing operations between decks of a memory system in accordance with examples as disclosed herein. The system 200 may be an example of a system 100 as described with reference to FIG. 1 or aspects thereof. For example, the system 200 may include a host system 205 and a memory system 210, which may be examples of the host system 105 and the memory system 110, respectively. In some cases, the system 200 may support a memory system controller 215 performing one or more maintenance operations on a memory array 220. For example, the memory system controller 215 may determine whether to perform a maintenance operation on one or more decks 230 of a first block 225 (e.g., a deck 230-a and a deck 230-b), one or more decks 245 of a second block 240 (e.g., a deck 245-a and a deck 245-b), or a combination thereof. By performing maintenance operations as described herein, the overall performance and reliability of the memory system 210 may be improved.

In some examples, the memory system controller 215 may perform maintenance operations on one or more blocks of the memory array 220. For example, the memory system controller 215 may perform a garbage collection operation on the one or more blocks in order to recycle pages of the blocks having. In some cases, the memory system controller 215 may identify one or more decks associated with a respective block, which may be examples of groupings of pages within the block. For example, a block 225 may include a first deck 230-a (e.g., a grouping of upper pages of the block 225) and may include a second deck 230-b (e.g., a grouping of lower pages of the block 225). Such decks associated with a same block may be referred to as sister decks. A block may include any quantity of sister decks and is not limited to the quantity depicted in the system 200.

The memory system controller 215 may perform independent operations (e.g., a programming operation, a read operation, an erase operation) on sister decks of a block. In some instances, the physical association between the sister decks (e.g., sharing common layers such as an SGD layer, an SGS layer, or the like) may result in adverse effects when the memory system controller 215 performs operations on one deck of the pair of sister decks. For example, when performing an erase operation on the deck 230-a, the memory system controller 215 may drive one or more word lines of the deck 230-b to a relatively high bias (e.g., a positive bias) to prevent erasing the deck 230-b (e.g., preventing hole injection into a charge trap layer). Such techniques, however, may degrade an overall health of both of the decks 230.

In some cases, the memory system controller 215 may track (e.g., maintain) a PEC count associated with sister decks of the memory array 220 to support mitigating a PEC difference between respective sets of sister decks. As an example, the memory system controller 215 may erase each sister deck of a block regardless of whether it is desirable to erase both sister decks. For example, the memory system controller 215 may determine to perform an erase operation on the deck 230-a and may determine not to perform the erase operation on the deck 230-b. In such an example, to maintain a similar PEC count between the deck 230-a and the deck 230-b, the memory system controller 215 may perform the erase operation on both the deck 230-a and the deck 230-b. However, data erased from the deck 230-b (e.g., initially excluded from the erase operation) may be re-written to the deck 230-b, which may increase write amplification associated with the memory system 210.

In some examples, to support mitigating a PEC difference between sister decks, the memory system controller 215 may associate sister decks of the memory array 220 with respective VBs. For example, the memory system controller 215 may associate the deck 230-a with a VB 235-a and may associate the deck 230-b with a VB 235-b. In some cases, the VB 235-a may be associated with a first index (e.g., $VB_0$) and the VB 235-b may be associated with a second index (e.g., $VB_1$) that is subsequent (e.g., sequential) to the first index. Such indexing may enable the memory system controller 215 to identify VBs that are associated with a same block. For example, the memory system controller 215 may determine that the VB 235-a and the VB 235-b are each associated with a same block (e.g., the block 225) based on the indices $VB_0$ and $VB_1$ forming a sequential odd-even pair.

As part of a maintenance operation, the memory system controller 215 may generate a garbage collection list (e.g., a list of VBs which are to be recycled). For example, the memory system controller 215 may scan each VB associated with the memory array 220 and may compare a VPC of each respective VB with a first threshold value (e.g., gc_vpc_threshold). If the VPC of a VB satisfies the first threshold value (e.g., if the VPC is below the threshold value), the memory system controller 215 may include the VB in the garbage collection list. For example, the memory system controller 215 may determine that a first VPC of the VB 235-a and a second VPC of the VB 235-b are each below the first threshold value, and may add the VB 235-a and the VB 235-b to the garbage collection list. As another example, the memory system controller 215 may determine that a third VPC of the VB 250-a (e.g., associated with the deck 245-a of the block 240) exceeds the first threshold value (e.g., does not satisfy the first threshold value) and may determine that a fourth VPC of the VB 250-b (e.g., associated with the deck 245-b of the block 240) satisfies the first threshold value, and may add the VB 250-b to the garbage collection list.

The memory system controller 215 may scan the garbage collection list to identify one or more decks to perform the maintenance operation on. In some examples, the memory system controller 215 may prioritize recycling blocks having a set of VBs included in the list. For example, the memory system controller 215 may perform a maintenance operation on the VB 235-a and the VB 235-b due to the VB 235-a and the VB 235-b forming an even-odd pair (e.g., $VB_0$ and $VB_1$). In other examples, the memory system controller 215 may not perform a maintenance operation on the VB 250-a and the VB 250-b (e.g., at this instance) due to the VB 250-a not being included in the list.

In some examples, the memory system controller 215 may determine a difference in PEC counts between VBs of sister decks. Such a comparison may occur if the memory system controller 215 identifies that at least one VB of a set of sister decks is not included in the garbage collection list. For example, the memory system controller 215 may identify that the VB 250-a is not included in the garbage collection list and may identify that the VB 250-b is included in the garbage collection list. In some cases, the memory system controller 215 may determine a first quantity of PECs associated with the VB 250-a and may determine a second quantity of PECs associated with the VB 250-b. To determine whether to perform the maintenance operation on the deck 245-b (associated with the VB 250-b) or on both the deck 245-a and the deck 245-b (e.g., associated with the VB 250-a and the VB 250-b, respectively), the memory system controller 215 may determine a difference in the PEC counts of the VB 250-a and the VB 250-b (e.g., sister VBs), and may compare the result (e.g., the difference) with a second threshold value (e.g., sister_deck_pec_diff_percent).

For example, the memory system controller 215 may determine that the difference between the first quantity of PECs and the second quantity of PECs satisfies the second threshold value (e.g., is below a 10% difference in PEC count). Such a determination may result in the memory system controller 215 refraining from performing the maintenance operation on the sister block not included in the garbage collection list. For example, the memory system controller 215 may refrain from performing the maintenance operation on the deck 245-a (e.g., a portion of the block 240) for a duration (e.g., a first duration). The memory system controller 215 may refrain from performing the maintenance operation because the difference in PEC counts of the sister VBs may be able to further-deviate before performing a maintenance operation is performed.

As another example, the memory system controller 215 may determine that the difference between the first quantity of PECs and the second quantity of PECs is greater than the threshold difference. Based on such a determination, the memory system controller 215 may compare the difference between the first quantity of PECs and the second quantity of PECs with a third threshold value (e.g., sister_deck_pec_diff_percent_extreme). The third threshold value may indicate a relatively high (e.g., an extreme) difference in PEC counts between sister decks. In some cases, the memory system controller 215 may identify that the difference in PEC counts satisfies the third threshold value (e.g., is greater than or equal to the third threshold value). In such an example, the memory system controller 215 may perform the maintenance operation on each of the sister decks to prevent the difference in PEC from becoming larger.

In some cases, the memory system controller 215 may identify that the difference between the first quantity of PECs and the second quantity of PECs is less than the third threshold value. In such cases, the memory system controller 215 may identify a VPC associated with the sister deck not included in the garbage collection list (e.g., the third VPC of the VB 250-a) and may compare the VPC with a fourth threshold value (e.g., gc_vpc_threshold_relax) to determine whether to perform the maintenance operation on the sister deck. For example, the memory system controller 215 may schedule the maintenance operation for the VB 250-a based on the third VPC being below the fourth threshold value.

Alternatively, the memory system controller 215 may refrain, for at least a duration (e.g., a second duration until the third VPC falls below the first threshold value or a PEC difference between the sister VBs exceeds the third threshold value), from performing the maintenance operation on the deck 245-a (e.g., a portion of the block 240) based on the third VPC exceeding (e.g., not satisfying) the fourth threshold value. The fourth threshold value may indicate a threshold quantity of VPCs that is marginally larger than the first threshold value (e.g., the threshold quantity of VPCs indicating an eligibility for a VB to be included in the garbage collection list). By performing maintenance operations on VBs as described herein, the overall performance and reliability of the memory system 210 may be improved while mitigating adverse effects, such as write amplification.

Figure 3:
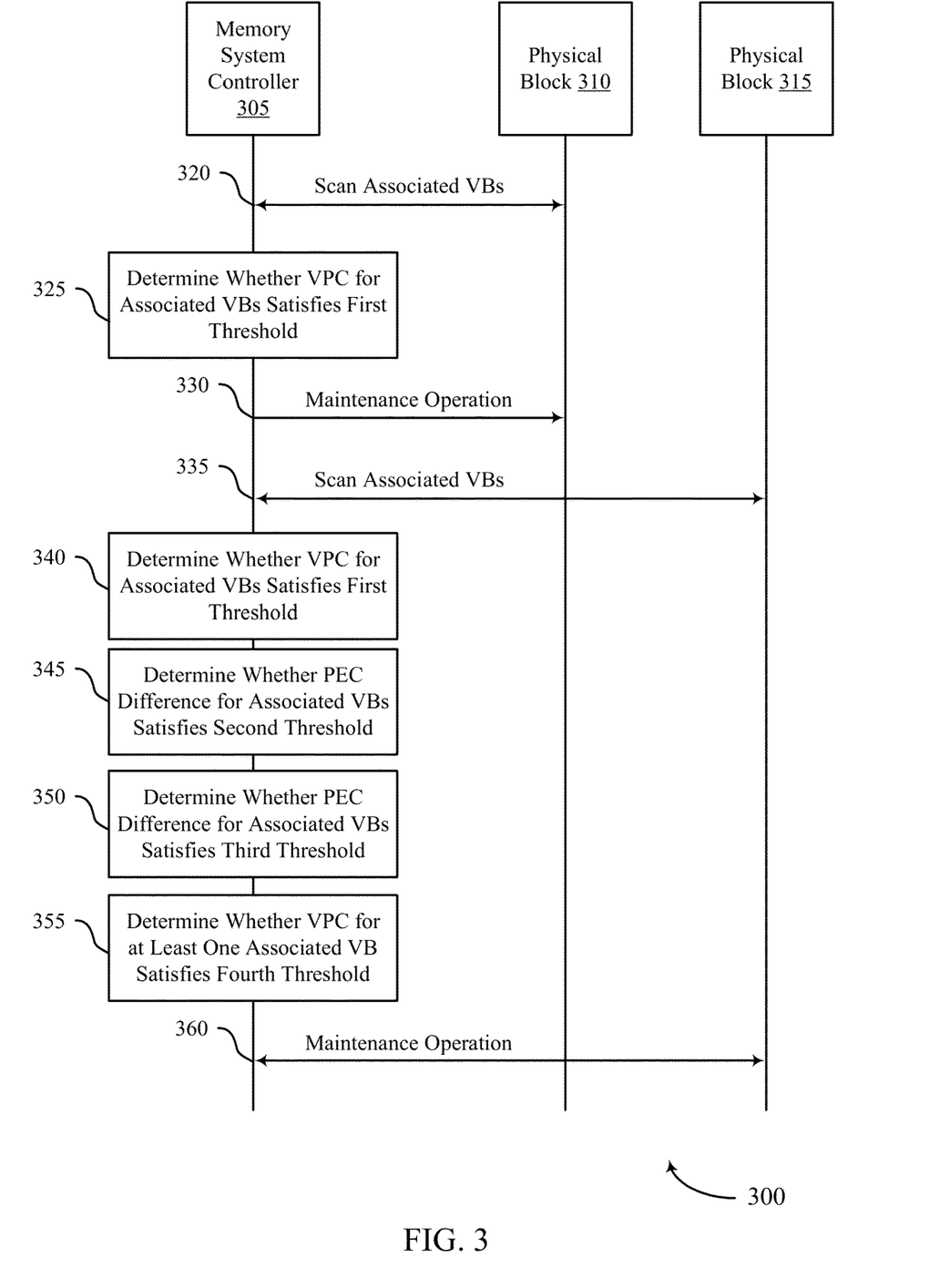
FIG. 3 illustrates an example of a process flow that supports synchronizing operations between decks of a memory system in accordance with examples as disclosed herein.

FIG. 3 illustrates an example of a process flow 300 that supports synchronizing operations between decks of a memory system in accordance with examples as disclosed herein. The process flow 300 may include one or more aspects of the system 100 and the system 200. For example, the process flow 300 may include a memory system controller 305, a physical block 310, and a physical block 315, which may be examples of the corresponding devices described herein, including with reference to FIGS. 1 and 2.

The process flow 300 may illustrate an example of the memory system controller 305 scanning virtual blocks associated with the physical block 310 and the physical block 315 to determine whether to perform a maintenance operation. In some cases, the memory system controller 305 may be associated with a set of multiple physical blocks including the physical block 310 and the physical block 315. Alternative examples of the following may be implemented, where some processes are performed in a different order than described or are not performed. In some cases, processes may include additional features not mentioned below, or further processes may be added.

Aspects of the process flow 300 may be implemented by a memory system controller, among other components. Additionally, or alternatively, aspects of the process flow 300 may be implemented as instructions stored in memory (e.g., firmware stored in a memory coupled with a host system or a memory system). For example, the instructions, when executed by a controller (e.g., the memory system controller 305), may cause the controller to perform the operations of the process flow 300.

At 320, the memory system controller 305 may scan one or more VBs associated with the physical block 310. For example, the physical block 310 may include at least a first deck and a second deck, and the memory system controller 305 may identify a first pair of VBs including a first VB associated with memory cells of the first deck and a second VB associated with memory cells of the second deck.

In some cases, the first VB and the second VB may have sequential indices, such as $VB_0$ and $VB_1$, respectively. The memory system controller 305 may identify that the first VB and the second VB are associated with respective decks of a same physical block (e.g., sister decks of the physical block 310) based on the indices of the first VB and the second VB, due to the indices forming an even-odd pair.

At 325, the memory system controller 305 may determine whether a first VPC of the first VB and a second VPC of the second VB each satisfy a first threshold value (e.g., gc_vpc_threshold). In some cases, the memory system controller 305 may include each VB that satisfies the threshold value in a list of VBs to perform a maintenance operation on, such as a garbage collection list. The first threshold value may indicate a quantity (e.g., a maximum quantity) of valid pages a VB may have in order to be eligible for a maintenance operation. In some cases, the memory system controller 305 may be operable to configure, adjust, or otherwise modify the first threshold value (e.g., based on the memory system characterization data, maturity, or both).

At 330, the memory system controller 305 may perform the maintenance operation on the physical block 310 associated with the first VB and the second VB. In some cases, performing the maintenance operation may be based on determining that the first VPC and the second VPC each satisfy the first threshold value. Such a determination may indicate that it may be beneficial to perform a maintenance operation on each of the first VB and the second VB, and thus the memory system controller 305 may maintain a similar PEC difference between the first VB and the second VB (e.g., by performing the maintenance operation on both).

At 335, the memory system controller 305 may scan one or more VBs associated with the physical block 315. For example, the physical block 315 may include at least a third deck and a fourth deck, and the memory system controller 305 may identify a second pair of VBs including a third VB associated with memory cells of the third deck and a fourth VB associated with memory cells of the fourth deck. In some cases, the third VB and the fourth VB may have sequential indices, such as $VB_2$ and $VB_3$, respectively. The memory system controller 305 may identify that the third VB and the fourth VB are associated with respective decks of a same physical block (e.g., sister decks of the physical block 315) based on the indices of the third VB and the fourth VB forming an even-odd pair.

At 340, the memory system controller 305 may determine whether a third VPC of the third VB and a fourth VPC of the fourth VB each satisfy a first threshold value (e.g., gc_vpc_threshold). In some cases, the memory system controller 305 may include each VB that satisfies the threshold value (e.g., includes a VPC below the threshold value) in the garbage collection list.

At 345, the memory system controller 305 determine whether a difference in a first quantity of PECs associated with the third VB and a second quantity of PECs associated with the fourth VB satisfies a second threshold value (e.g., sister_deck_pec_diff_percent). In some cases, the determination may be based on the memory system controller 305 determining that the third VPC does not satisfy the first threshold value.

For example, the fourth VB may be included in the garbage collection list and the third VB may not be included in the list. The second threshold value may indicate a difference in PEC counts between sister decks (e.g., as stipulated by a system specification). In some cases, the memory system controller 305 may be operable to configure, adjust, or otherwise modify the second threshold value (e.g., based on the memory system characterization data, maturity, or both).

In some cases, the memory system controller 305 may determine that the difference between the first quantity of PECs and the second quantity of PECs fails to satisfy the second threshold value. For example, the memory system controller 305 may determine that the difference between the first quantity of PECs and the second quantity of PECs is below the threshold value (e.g., within the permissible range). Based on such a determination, the memory system controller 305 may refrain, for a first duration, from performing the maintenance operation on a portion of the physical block 315 associated with the third VB. In some examples, the first duration may indicate a time until the difference in PEC counts between the third VB and the fourth VB satisfies the second threshold value.

At 350, the memory system controller 305 may determine whether a value associated with the difference between the first quantity of PECs and the second quantity of PECs satisfies a third threshold value (e.g., sister_deck_pec_diff_percent_extreme). In some cases, the determination may be based on determining that the value satisfies the second threshold value (e.g., is greater than the permissible difference in PEC counts). In some cases, such as when the value satisfies the third threshold value, the memory system controller 305 may perform the maintenance operation on the physical block 315 associated with the third VB and the fourth VB (e.g., to prevent further deviation in PEC counts). In some examples, the third threshold value may indicate a relatively extreme difference between VPCs of the third VB and the fourth VB. In some cases, the memory system controller 305 may be operable to configure, adjust, or otherwise modify the third threshold value (e.g., based on the memory system characterization data, maturity, or both).

At 355, the memory system controller 305 may determine whether a VPC of the third VB, the fourth VB, or both, satisfies a fourth threshold value (e.g., gc_vpc_threshold_relax). In some cases, the determination may be based on the memory system controller 305 determining that the value fails to satisfy the third threshold value (e.g., the difference in PEC counts is less than the fourth threshold value). For example, the memory system controller 305 may determine that the third VPC of the third VB fails to satisfy the fourth threshold value. The memory system controller 305 may refrain, for a second duration, from performing the maintenance operation on a portion of the physical block 315 associated with the third VB based on the third VB failing to satisfy the fourth threshold value.

In some cases, the fourth threshold value may indicate a quantity of VPCs that is greater (e.g., marginally greater) than the quantity of VPCs indicated by the first threshold value. In some cases, the second duration may refer to a time until the third VPC falls below the fourth threshold, the difference in the first quantity of PECs and the second quantity of PECs satisfies the third threshold value, or both. In some cases, the memory system controller 305 may be operable to configure, adjust, or otherwise modify the fourth threshold value (e.g., based on the memory system characterization data, maturity, or both).

At 360, the memory system controller 305 may perform the maintenance operation on the physical block 315 associated with the third VB and the fourth VB. In some cases, performing the maintenance operation may be based on determining that the third VPC satisfies the fourth threshold value. For example, the memory system controller 305 may perform the maintenance operation on both the third VB and the fourth VB to support the VBs having a same or similar PEC count. By performing maintenance operations on VBs as described herein, the overall performance and reliability of the associated memory system may be improved while mitigating adverse effects, such as write amplification.

Figure 4:
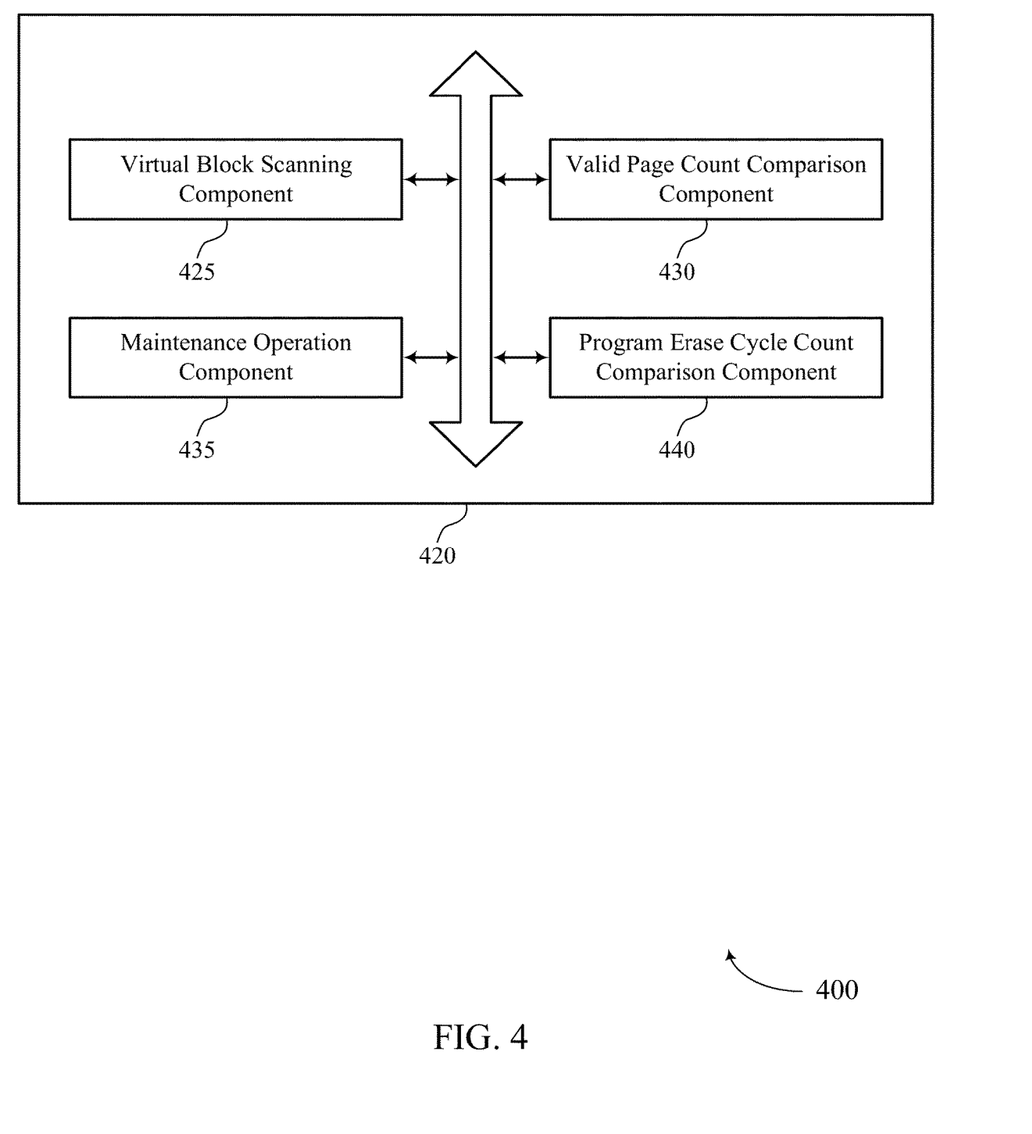
FIG. 4 illustrates a block diagram of a memory system that supports synchronizing operations between decks of a memory system in accordance with examples as disclosed herein.

FIG. 4 illustrates a block diagram 400 of a memory system 420 that supports synchronizing operations between decks of a memory system in accordance with examples as disclosed herein. The memory system 420 may be an example of aspects of a memory system as described with reference to FIGS. 1 through 3. The memory system 420, or various components thereof, may be an example of means for performing various aspects of synchronizing operations between decks of a memory system as described herein. For example, the memory system 420 may include a virtual block scanning component 425, a valid page count comparison component 430, a maintenance operation component 435, a program erase cycle count comparison component 440, or any combination thereof. Each of these components may communicate, directly or indirectly, with one another (e.g., via one or more buses).

The virtual block scanning component 425 may be configured as or otherwise support a means for determining a first valid page count of a first virtual block of a pair of virtual blocks and a second valid page count of a second virtual block of the pair of virtual blocks, where the first virtual block includes memory cells of a first deck of a first physical block and the second virtual block includes memory cells of a second deck of the first physical block. The valid page count comparison component 430 may be configured as or otherwise support a means for determining whether the first valid page count and the second valid page count each satisfy a first threshold value based at least in part on determining the first valid page count and the second valid page count. The maintenance operation component 435 may be configured as or otherwise support a means for performing a maintenance operation on the first physical block associated with the first virtual block and the second virtual block based at least in part on determining that the first valid page count and the second valid page count each satisfy the first threshold value.

In some examples, the valid page count comparison component 430 may be configured as or otherwise support a means for determining that a third valid page count of a third virtual block included in a second pair of virtual blocks does not satisfy the first threshold value, where the second pair of virtual blocks includes the third virtual block and a fourth virtual block. In some examples, the program erase cycle count comparison component 440 may be configured as or otherwise support a means for determining whether a difference between a first quantity of program erase cycles associated with the third virtual block and a second quantity of program erase cycles associated with the fourth virtual block satisfies a second threshold value.

In some examples, the maintenance operation component 435 may be configured as or otherwise support a means for refraining, for a first duration, from performing a maintenance operation on a portion of a second physical block associated with the third virtual block based at least in part on determining that the difference between the first quantity of program erase cycles and the second quantity of program erase cycles fails to satisfy the second threshold value.

In some examples, the valid page count comparison component 430 may be configured as or otherwise support a means for determining that a fourth valid page count of the fourth virtual block of the second pair of virtual blocks satisfies the first threshold value.

In some examples, the program erase cycle count comparison component 440 may be configured as or otherwise support a means for determining whether a value associated with the difference between the first quantity of program erase cycles and the second quantity of program erase cycles satisfies a third threshold value.

In some examples, the maintenance operation component 435 may be configured as or otherwise support a means for performing a maintenance operation on a second physical block associated with the third virtual block and the fourth virtual block based at least in part on determining that the value satisfies the third threshold value.

In some examples, the valid page count comparison component 430 may be configured as or otherwise support a means for determining whether the third valid page count of the third virtual block satisfies a fourth threshold value based at least in part on determining that the value fails to satisfy the third threshold value.

In some examples, the maintenance operation component 435 may be configured as or otherwise support a means for performing a maintenance operation on a second physical block associated with the third virtual block and the fourth virtual block based at least in part on determining that the third valid page count of the third virtual block satisfies the fourth threshold value.

In some examples, the maintenance operation component 435 may be configured as or otherwise support a means for refraining, for a second duration, from performing a maintenance operation on a portion of a second physical block associated with the third virtual block based at least in part on determining that the third valid page count of the third virtual block fails to satisfy the fourth threshold value.

In some examples, a memory system includes a plurality of physical blocks that are each associated with a pair of virtual blocks of a plurality of virtual blocks.

Figure 5:
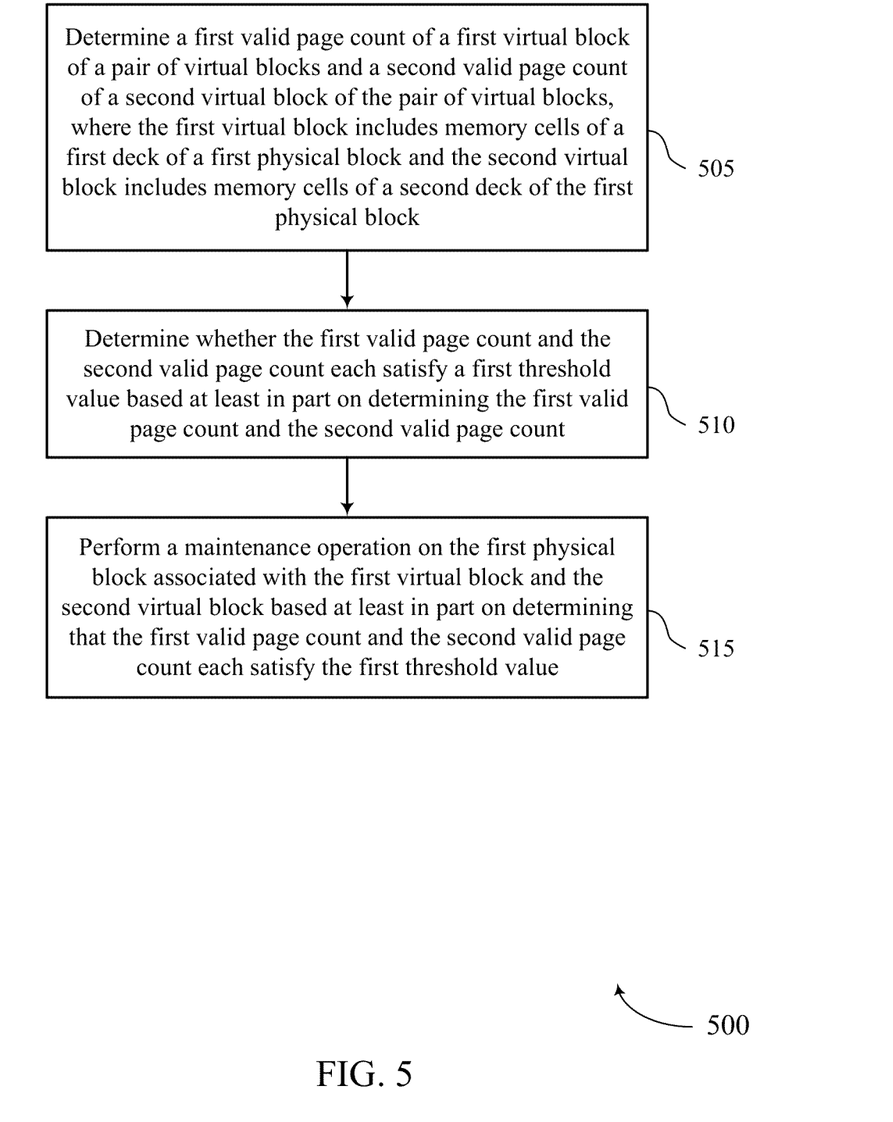
FIG. 5 illustrates a flowchart showing a method or methods that support synchronizing operations between decks of a memory system in accordance with examples as disclosed herein.

FIG. 5 illustrates a flowchart showing a method 500 that supports synchronizing operations between decks of a memory system in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include determining a first valid page count of a first virtual block of a pair of virtual blocks and a second valid page count of a second virtual block of the pair of virtual blocks, where the first virtual block includes memory cells of a first deck of a first physical block and the second virtual block includes memory cells of a second deck of the first physical block. The operations of 505 may be performed in accordance with examples as disclosed herein. In some examples, aspects of the operations of 505 may be performed by a virtual block scanning component 425 as described with reference to FIG. 4.

At 510, the method may include determining whether the first valid page count and the second valid page count each satisfy a first threshold value based at least in part on determining the first valid page count and the second valid page count. The operations of 510 may be performed in accordance with examples as disclosed herein. In some examples, aspects of the operations of 510 may be performed by a valid page count comparison component 430 as described with reference to FIG. 4.

At 515, the method may include performing a maintenance operation on the first physical block associated with the first virtual block and the second virtual block based at least in part on determining that the first valid page count and the second valid page count each satisfy the first threshold value. The operations of 515 may be performed in accordance with examples as disclosed herein. In some examples, aspects of the operations of 515 may be performed by a maintenance operation component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining a first valid page count of a first virtual block of a pair of virtual blocks and a second valid page count of a second virtual block of the pair of virtual blocks, where the first virtual block includes memory cells of a first deck of a first physical block and the second virtual block includes memory cells of a second deck of the first physical block; determining whether the first valid page count and the second valid page count each satisfy a first threshold value based at least in part on determining the first valid page count and the second valid page count; and performing a maintenance operation on the first physical block associated with the first virtual block and the second virtual block based at least in part on determining that the first valid page count and the second valid page count each satisfy the first threshold value.

Aspect 2: The method, apparatus, or non-transitory computer-readable medium of aspect 1, further including operations, features, circuitry, logic, means, or instructions, or any combination thereof for determining that a third valid page count of a third virtual block included in a second pair of virtual blocks does not satisfy the first threshold value, where the second pair of virtual blocks includes the third virtual block and a fourth virtual block and determining whether a difference between a first quantity of program erase cycles associated with the third virtual block and a second quantity of program erase cycles associated with the fourth virtual block satisfies a second threshold value.

Aspect 3: The method, apparatus, or non-transitory computer-readable medium of aspect 2, further including operations, features, circuitry, logic, means, or instructions, or any combination thereof for refraining, for a first duration, from performing a maintenance operation on a portion of a second physical block associated with the third virtual block based at least in part on determining that the difference between the first quantity of program erase cycles and the second quantity of program erase cycles fails to satisfy the second threshold value.

Aspect 4: The method, apparatus, or non-transitory computer-readable medium of any of aspects 2 through 3, further including operations, features, circuitry, logic, means, or instructions, or any combination thereof for determining that a fourth valid page count of the fourth virtual block of the second pair of virtual blocks satisfies the first threshold value.

Aspect 5: The method, apparatus, or non-transitory computer-readable medium of any of aspects 2 through 4, further including operations, features, circuitry, logic, means, or instructions, or any combination thereof for determining whether a value associated with the difference between the first quantity of program erase cycles and the second quantity of program erase cycles satisfies a third threshold value.

Aspect 6: The method, apparatus, or non-transitory computer-readable medium of aspect 5, further including operations, features, circuitry, logic, means, or instructions, or any combination thereof for performing a maintenance operation on a second physical block associated with the third virtual block and the fourth virtual block based at least in part on determining that the value satisfies the third threshold value.

Aspect 7: The method, apparatus, or non-transitory computer-readable medium of any of aspects 5 through 6, further including operations, features, circuitry, logic, means, or instructions, or any combination thereof for determining whether the third valid page count of the third virtual block satisfies a fourth threshold value based at least in part on determining that the value fails to satisfy the third threshold value.

Aspect 8: The method, apparatus, or non-transitory computer-readable medium of aspect 7, further including operations, features, circuitry, logic, means, or instructions, or any combination thereof for performing a maintenance operation on a second physical block associated with the third virtual block and the fourth virtual block based at least in part on determining that the third valid page count of the third virtual block satisfies the fourth threshold value.

Aspect 9: The method, apparatus, or non-transitory computer-readable medium of any of aspects 7 through 8, further including operations, features, circuitry, logic, means, or instructions, or any combination thereof for refraining, for a second duration, from performing a maintenance operation on a portion of a second physical block associated with the third virtual block based at least in part on determining that the third valid page count of the third virtual block fails to satisfy the fourth threshold value.

Aspect 10: The method, apparatus, or non-transitory computer-readable medium of any of aspects 1 through 9, where a memory system includes a plurality of physical blocks that are each associated with a pair of virtual blocks of a plurality of virtual blocks.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller coupled with the memory device and configured to cause the apparatus to:
      determine a first valid page count of a first virtual block of a pair of virtual blocks and a second valid page count of a second virtual block of the pair of virtual blocks, wherein the first virtual block comprises memory cells of a first deck of a first physical block and the second virtual block comprises memory cells of a second deck of the first physical block;
      determine whether the first valid page count and the second valid page count each satisfy a first threshold value based at least in part on determining the first valid page count and the second valid page count; and
      perform a maintenance operation on the first physical block associated with the first virtual block and the second virtual block based at least in part on determining that the first valid page count and the second valid page count each satisfy the first threshold value.

2. The apparatus of claim 1, wherein the controller is further configured to cause the apparatus to:
   determine that a third valid page count of a third virtual block included in a second pair of virtual blocks does not satisfy the first threshold value, wherein the second pair of virtual blocks comprises the third virtual block and a fourth virtual block; and
   determine whether a difference between a first quantity of program erase cycles associated with the third virtual block and a second quantity of program erase cycles associated with the fourth virtual block satisfies a second threshold value.

3. The apparatus of claim 2, wherein the controller is further configured to cause the apparatus to:
   refrain, for a first duration, from performing the maintenance operation on a portion of a second physical block associated with the third virtual block based at least in part on determining that the difference between the first quantity of program erase cycles and the second quantity of program erase cycles fails to satisfy the second threshold value.

4. The apparatus of claim 2, wherein the controller is further configured to cause the apparatus to:
   determine that a fourth valid page count of the fourth virtual block of the second pair of virtual blocks satisfies the first threshold value.

5. The apparatus of claim 2, wherein the controller is further configured to cause the apparatus to:
   determine whether a value associated with the difference between the first quantity of program erase cycles and the second quantity of program erase cycles satisfies a third threshold value different than the second threshold value.

6. The apparatus of claim 5, wherein the controller is further configured to cause the apparatus to:
   perform the maintenance operation on a second physical block associated with the third virtual block and the fourth virtual block based at least in part on determining that the value satisfies the third threshold value.

7. The apparatus of claim 5, wherein the controller is further configured to cause the apparatus to:
   determine whether the third valid page count of the third virtual block satisfies a fourth threshold value based at least in part on determining that the value fails to satisfy the third threshold value, the fourth threshold value different than the first threshold value.

8. The apparatus of claim 7, wherein the controller is further configured to cause the apparatus to:
   perform the maintenance operation on a second physical block associated with the third virtual block and the fourth virtual block based at least in part on determining that the third valid page count of the third virtual block satisfies the fourth threshold value.

9. The apparatus of claim 7, wherein the controller is further configured to cause the apparatus to:
   refrain, for a second duration, from performing the maintenance operation on a portion of a second physical block associated with the third virtual block based at least in part on determining that the third valid page count of the third virtual block fails to satisfy the fourth threshold value.

10. The apparatus of claim 1, wherein a memory system comprises a plurality of physical blocks that are each associated with a pair of virtual blocks of a plurality of virtual blocks.

11. A non-transitory computer-readable medium storing code comprising instructions which, when executed by a processor of an electronic device, cause the electronic device to:
    determine a first valid page count of a first virtual block of a pair of virtual blocks and a second valid page count of a second virtual block of the pair of virtual blocks, wherein the first virtual block comprises memory cells of a first deck of a first physical block and the second virtual block comprises memory cells of a second deck of the first physical block;
    determine whether the first valid page count and the second valid page count each satisfy a first threshold value based at least in part on determining the first valid page count and the second valid page count; and
    perform a maintenance operation on the first physical block associated with the first virtual block and the second virtual block based at least in part on determining that the first valid page count and the second valid page count each satisfy the first threshold value.

12. The non-transitory computer-readable medium of claim 11, wherein the instructions, when executed by the processor of the electronic device, further cause the electronic device to:
- determine that a third valid page count of a third virtual block included in a second pair of virtual blocks does not satisfy the first threshold value, wherein the second pair of virtual blocks comprises the third virtual block and a fourth virtual block; and
- determine whether a difference between a first quantity of program erase cycles associated with the third virtual block and a second quantity of program erase cycles associated with the fourth virtual block satisfies a second threshold value.

13. The non-transitory computer-readable medium of claim 12, wherein the instructions, when executed by the processor of the electronic device, further cause the electronic device to:
- refrain, for a first duration, from performing the maintenance operation on a portion of a second physical block associated with the third virtual block based at least in part on determining that the difference between the first quantity of program erase cycles and the second quantity of program erase cycles fails to satisfy the second threshold value.

14. The non-transitory computer-readable medium of claim 12, wherein the instructions, when executed by the processor of the electronic device, further cause the electronic device to:
- determine that a fourth valid page count of the fourth virtual block of the second pair of virtual blocks satisfies the first threshold value.

15. The non-transitory computer-readable medium of claim 12, wherein the instructions, when executed by the processor of the electronic device, further cause the electronic device to:
- determine whether a value associated with the difference between the first quantity of program erase cycles and the second quantity of program erase cycles satisfies a third threshold value different than the second threshold value.

16. The non-transitory computer-readable medium of claim 15, wherein the instructions, when executed by the processor of the electronic device, further cause the electronic device to:
- perform the maintenance operation on a second physical block associated with the third virtual block and the fourth virtual block based at least in part on determining that the value satisfies the third threshold value.

17. The non-transitory computer-readable medium of claim 15, wherein the instructions, when executed by the processor of the electronic device, further cause the electronic device to:
- determine whether the third valid page count of the third virtual block satisfies a fourth threshold value based at least in part on determining that the value fails to satisfy the third threshold value, the fourth threshold value different than the first threshold value.

18. The non-transitory computer-readable medium of claim 17, wherein the instructions, when executed by the processor of the electronic device, further cause the electronic device to:
- perform the maintenance operation on a second physical block associated with the third virtual block and the fourth virtual block based at least in part on determining that the third valid page count of the third virtual block satisfies the fourth threshold value.

19. The non-transitory computer-readable medium of claim 17, wherein the instructions, when executed by the processor of the electronic device, further cause the electronic device to:
- refrain, for a second duration, from performing the maintenance operation on a portion of a second physical block associated with the third virtual block based at least in part on determining that the third valid page count of the third virtual block fails to satisfy the fourth threshold value.

20. A method, comprising:
- determining a first valid page count of a first virtual block of a pair of virtual blocks and a second valid page count of a second virtual block of the pair of virtual blocks, wherein the first virtual block comprises memory cells of a first deck of a first physical block and the second virtual block comprises memory cells of a second deck of the first physical block;
- determining whether the first valid page count and the second valid page count each satisfy a first threshold value based at least in part on determining the first valid page count and the second valid page count; and
- performing a maintenance operation on the first physical block associated with the first virtual block and the second virtual block based at least in part on determining that the first valid page count and the second valid page count each satisfy the first threshold value.

* * * * *